E. MEARS.
NAPKIN-HOLDER.

No. 195,831.  Patented Oct. 2, 1877.

WITNESSES:
Francis McArdle.
J. H. Scarborough.

INVENTOR:
E. Mears.
BY
ATTORNEYS.

UNITED STATES PATENT OFFICE.

EPHRAIM MEARS, OF TERRE HAUTE, INDIANA, ASSIGNOR TO HIMSELF AND SAMUEL M. YOUNG, OF SAME PLACE.

IMPROVEMENT IN NAPKIN-HOLDERS.

Specification forming part of Letters Patent No. 195,831, dated October 2, 1877; application filed May 21, 1877.

*To all whom it may concern:*

Figure 1:
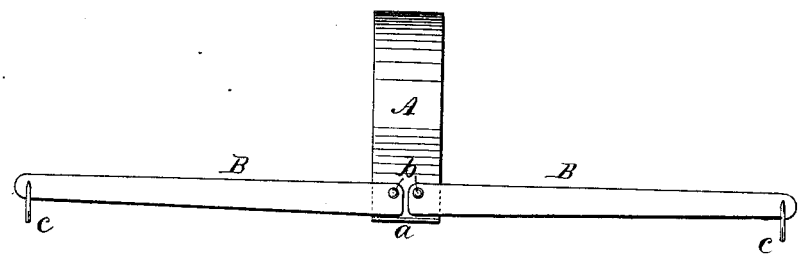
Figure 2:
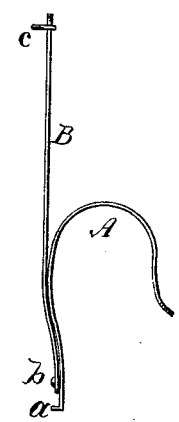

Be it known that I, EPHRAIM MEARS, of Terre Haute, Vigo county, Indiana, have invented a new and Improved Napkin-Holder, of which the following is a specification:

Figure 1 is a front view of my improved napkin-holder; and Fig. 2 is a side elevation, representing the holder as folded together.

My invention consists of a hook to which two arms are pivoted, which open horizontally, and are provided at their free ends with hooks for receiving the napkin.

The object of the invention is to provide a napkin-holder which will spread the napkin, so that it will more thoroughly protect the clothing.

In the drawing, A is a hook, having formed upon it the lip $a$. Extensible arms B are pivoted to the shank of the hook at $b$, and when placed in a horizontal position, as shown in Fig. 1, they are supported by the lip $a$. Curved pointed hooks $c$ are attached to the ends of the arms B for receiving the napkin.

When the holder is not in use the arms B are folded together parallel with the hook A.

The hook A may be placed over the shirt-collar, or it may be hooked into the vest.

Having thus described my invention, I claim as new and desire to secure by Letters Patent—

A napkin-holder consisting of the hook A, having the lip $a$, and the extensible arms B B, pivoted to the shank of the hook, and provided with pointed hooks $c$, substantially as shown and described.

EPHRAIM MEARS.

Witnesses:
SAML. M. YOUNG,
ED. T. SALE.